(12) United States Patent
Keith

(10) Patent No.: US 7,729,586 B2
(45) Date of Patent: Jun. 1, 2010

(54) TELECOMMUNICATIONS PATCHING SYSTEMS WITH VERTICALLY-ORIENTED PATCHING MODULES

(75) Inventor: Scott Martin Keith, Plano, TX (US)

(73) Assignee: Commscope Inc. of North Carolina, Hickory, NC (US)

( * ) Notice: Subject to any disclaimer, the term of this patent is extended or adjusted under 35 U.S.C. 154(b) by 0 days.

(21) Appl. No.: 12/275,480

(22) Filed: Nov. 21, 2008

(65) Prior Publication Data

US 2010/0086274 A1 Apr. 8, 2010

Related U.S. Application Data

(63) Continuation-in-part of application No. 12/246,697, filed on Oct. 7, 2008, now abandoned.

(51) Int. Cl.
G02B 6/00 (2006.01)
(52) U.S. Cl. .................................................. 385/135
(58) Field of Classification Search ................. 385/135
See application file for complete search history.

(56) References Cited

U.S. PATENT DOCUMENTS

| | | | |
|---|---|---|---|
| 5,758,003 A * | 5/1998 | Wheeler et al. ............. | 385/135 |
| 6,236,795 B1 * | 5/2001 | Rodgers ..................... | 385/134 |
| 6,416,262 B1 | 7/2002 | Puetz et al. | |
| 6,424,781 B1 | 7/2002 | Puetz et al. | |
| 6,438,308 B1 | 8/2002 | Philips et al. | |
| 6,535,682 B1 | 3/2003 | Puetz et al. | |
| 6,556,763 B1 | 4/2003 | Puetz et al. | |
| 6,738,554 B2 * | 5/2004 | Daoud et al. ................ | 385/135 |
| 6,903,266 B1 * | 6/2005 | Luciere ...................... | 385/135 |
| 7,031,588 B2 * | 4/2006 | Cowley et al. .............. | 385/135 |
| 2005/0220436 A1 * | 10/2005 | Mertesdorf et al. ......... | 385/135 |
| 2006/0029353 A1 * | 2/2006 | Bolster et al. ............... | 385/134 |
| 2007/0147764 A1 * | 6/2007 | Chang ........................ | 385/135 |

FOREIGN PATENT DOCUMENTS

WO 2004/010193 A1 1/2004
WO 2006/012389 A1 2/2006

OTHER PUBLICATIONS

Combined Search and Examination Report for UK Intellectual Property Office for GB 0917177.8 dated Nov. 5, 2009.
ADC Telecommunications, Inc. Brochure: "Room to Grow", one page, Website: www.adc.com/truenet, (2007).

* cited by examiner

*Primary Examiner*—Charlie Peng
(74) *Attorney, Agent, or Firm*—Myers Bigel Sibley & Sajovec

(57) ABSTRACT

A telecommunications patching system includes: a carrier having a horizontally disposed member with longitudinal slots; and at least one patching module. The module includes: a generally vertically disposed main panel; a plurality of connectors mounted on the main panel, the connectors configured to receive and interconnect patch cords; and a guide member connected with the main panel and received in one of the longitudinal slots of the carrier. The module is slidable relative to the carrier along a path defined by the slot between an access position, in which a front portion of the main panel slides forward so that the plurality of connectors are accessible to a technician, and a non-access position, in which the plurality of connectors are not accessible to a technician.

8 Claims, 4 Drawing Sheets

TELECOMMUNICATIONS PATCHING SYSTEMS WITH VERTICALLY-ORIENTED PATCHING MODULES

RELATED APPLICATIONS

This is a continuation-in-part application of and claims the benefit of priority from U.S. patent application Ser. No. 12/246,697 filed Oct. 7, 2008 now abandoned. the disclosure of which is incorporated herein by reference in its entirety.

FIELD OF THE INVENTION

The present invention relates generally to telecommunications equipment, and more particularly to high-density fiber distribution apparatus.

BACKGROUND

In the telecommunications industry, the use of fiber optic cables for carrying transmission signals is rapidly growing. To interconnect fiber optic equipment, fiber distribution frames and racks have been developed. Such frames and racks are typically located in a communications closet, data room, or the like, where technicians can easily connect and reconnect, or "patch," equipment in an organized and efficient manner. Examples of fiber distribution frames and racks are shown in U.S. Pat. Nos. 5,497,444 and 5,758,003, which are hereby incorporated by reference.

With the increase in use of fiber optic cables in the telecommunications industry, it is desirable to provide fiber distribution frames/racks with increased density. "Density" refers to the number of locations, or ports, per unit volume or unit area for providing connections within the rack; thus, increased density can provide more connection/patching sites per rack. Many racks are configured to include multiple shelves or trays of a specific size (a standard height of 1.75 inches is known in the industry as a "U"); the size of a rack may be described in terms of "U" (e.g., a "6 U" rack), and the shelves and trays may be described by the number of connections per "U" (e.g., 48 connections/U).

The space constraints associated with high-density distribution frames can cause cable and cord management problems. Effective cable/cord management can prevent excessive bending of fiber optic cables/cords within the frames. Effective cable/cord management may also reduce tangling of cables and cords, and may provide improved accessibility to components that may require servicing. Easily-understood labeling can also improve operator efficiency and accuracy. However, increased density can hamper desirable cable management practices.

SUMMARY

As a first aspect, embodiments of the present invention are directed to a telecommunications patching system. The system comprises: a carrier having a horizontally disposed member with longitudinal slots; and at least one patching module. The patching module comprises: a generally vertically disposed main panel; a plurality of connectors mounted on the main panel, the connectors configured to receive and interconnect patch cords; and a guide member connected with the main panel and received in one of the longitudinal slots of the carrier. The module is slidable relative to the carrier along a path defined by the slot between an access position, in which a front portion of the main panel slides forwardly so that the plurality of connectors are accessible to a technician, and a non-access position, in which the plurality of connectors are not accessible to a technician.

As a second aspect, embodiments of the present invention are directed to a telecommunication assembly. The assembly comprises: a frame having a pair of uprights; a carrier having a horizontally disposed member with longitudinal slots, the carrier mounted on the uprights of the frame; and at least one patching module. The patching module comprises: a generally vertically disposed main panel; a plurality of connectors mounted on the main panel, the connectors configured to receive and interconnect patch cords; and a guide member connected with the main panel and received in one of the longitudinal slots of the carrier. The assembly further comprises a plurality of patch cords, each of the patch cords being connected to a respective one of the connectors. The module is slidable relative to the carrier along a path defined by the slot between an access position, in which a front portion of the main panel slides forwardly so that the plurality of connectors are accessible to a technician, and a non-access position, in which the plurality of connectors are not accessible to a technician.

As a third aspect, embodiments of the present invention are directed to a telecommunications patching system comprising: a carrier having a horizontally disposed member; and at least one patching module suspended from the carrier. The patching module comprises a generally vertically disposed main panel and a plurality of connectors mounted on the main panel, the connectors configured to receive and interconnect patch cords.

DETAILED DESCRIPTION

Figure 1:
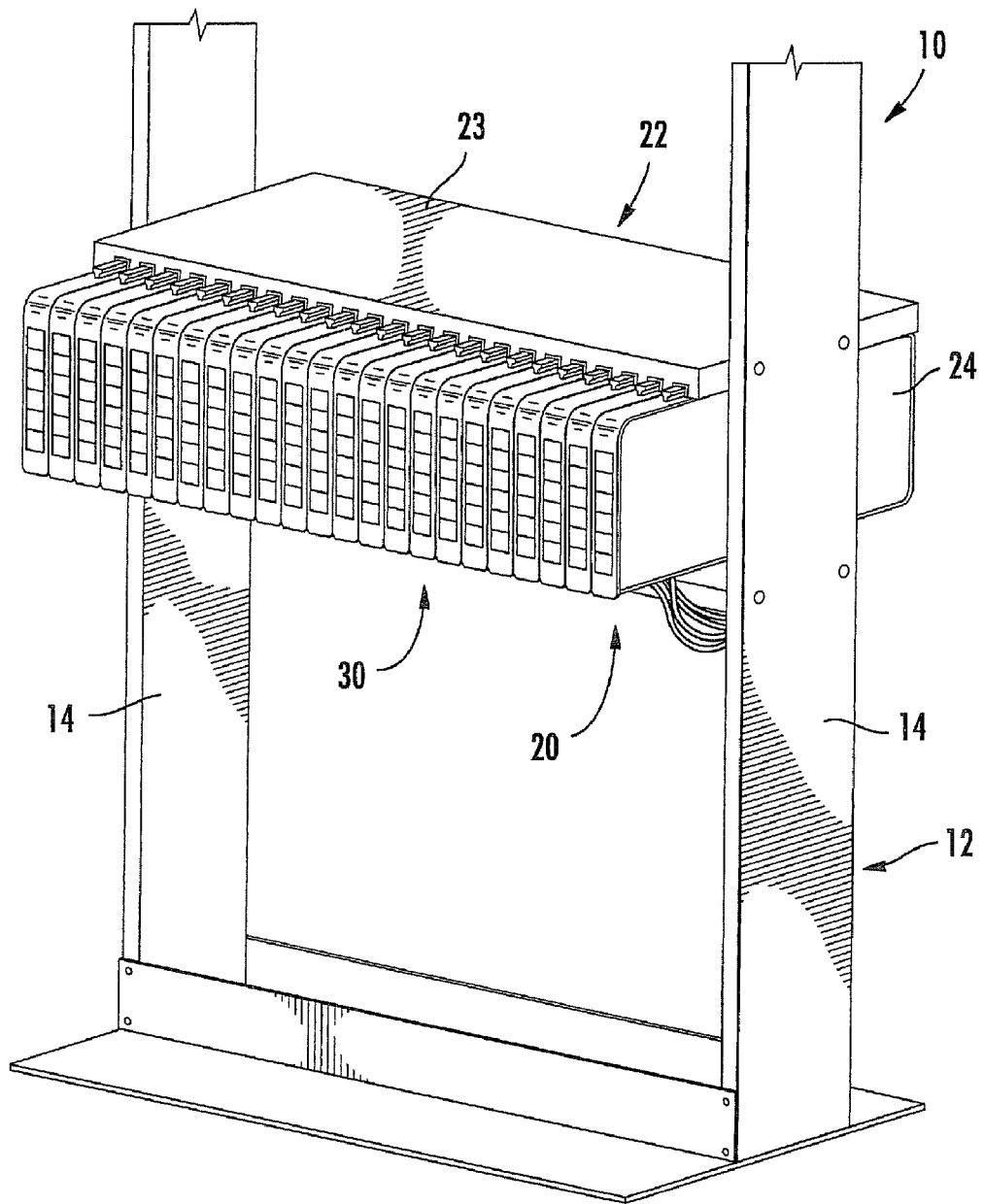
FIG. 1 is a perspective view of a telecommunications patching assembly with a patching module system according to embodiments of the present invention.

The present invention will be described more particularly hereinafter with reference to the accompanying drawings. The invention is not intended to be limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" or "above" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Where used, the terms "attached", "connected", "interconnected", "contacting", "mounted" and the like can mean either direct or indirect attachment or contact between elements, unless stated otherwise.

Also, as used herein the term "connector" is intended to encompass telecommunications connectors and devices employed to facilitate the interconnection of telecommunications cords and cables for the transmission of signals therebetween. A connector may include a termination device at the end of a cord or cable, an adapter that facilitates the interconnection of two termination devices (as may be employed in the interconnection of fiber optic cords and cables, such as may be found in a connector block), a jack, plug, or the like typically employed with copper cables and cords, or other devices that provide a location for the interconnection of cables and cords.

Turning now to the drawings, a telecommunications patching assembly, designated broadly at 10, is illustrated in FIG. 1. The rack 10 includes a frame 12 having two vertical, spaced apart uprights 14. Each of the uprights 14 includes mounting holes for the mounting of patching module systems 20. Although only one patching module system 20 is shown mounted therein, the rack 10 may (and typically will) include multiple patching module systems 20.

Figure 3:
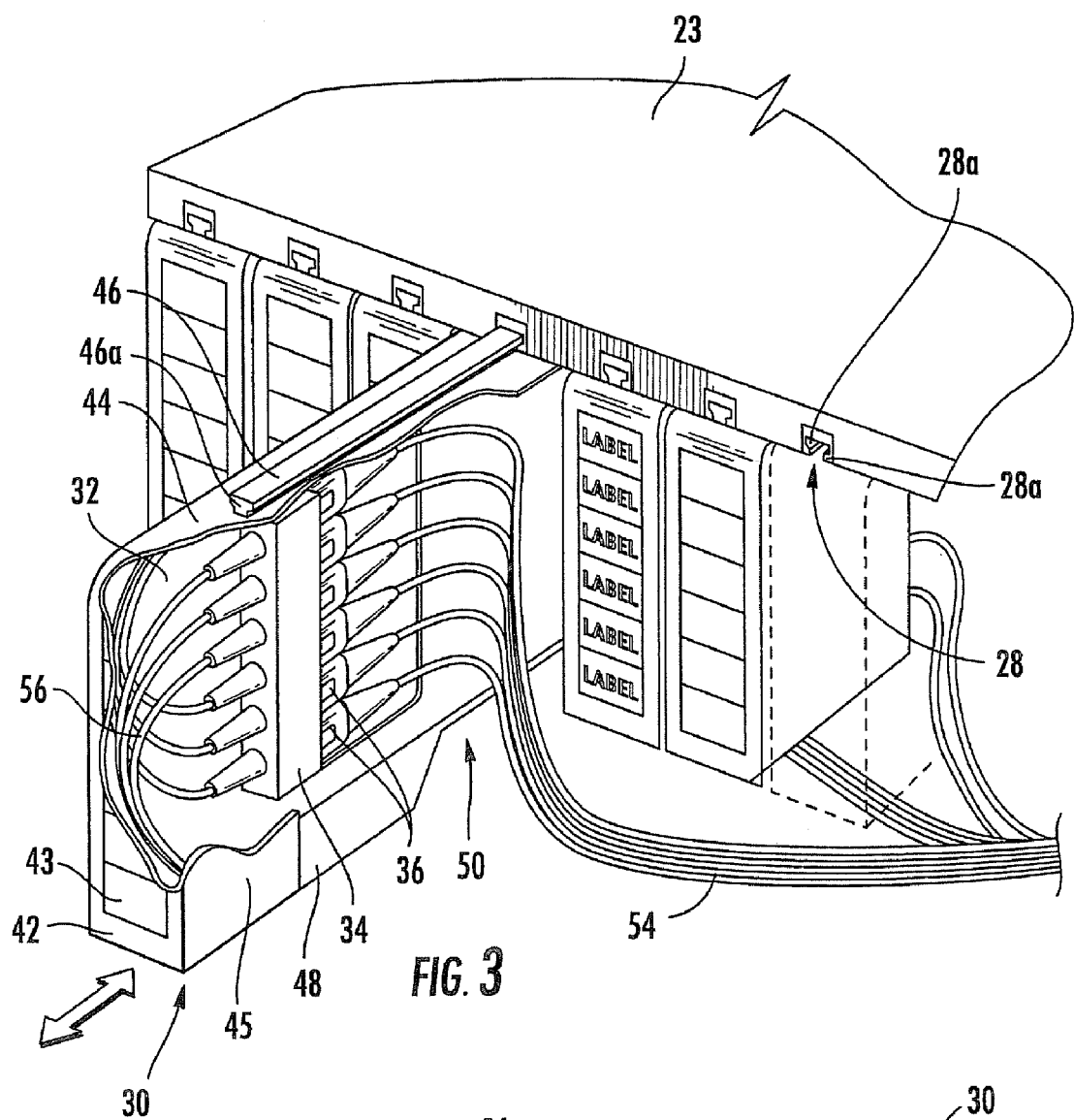
FIG. 3 is an enlarged perspective of the patching modules of FIG. 2 installed in the carrier of the patching module system of FIG. 1, with one of the patching modules shown in an access position.

Turning now to FIGS. 1 and 3, the patching module system 20 includes a module carrier 22. The carrier 22 includes a horizontally-disposed main panel 23 and opposing side walls 24 (only one side wall 24 is shown in FIG. 1). The main panel 23 has a plurality of parallel longitudinal slots 28 that extend from the front edge to the rear edge of the carrier 22. Each of the slots 28 includes a pair of lips 28a that cause the slots 28 to have generally a T-shaped profile. Those skilled in this art will recognize that other slot shapes, including triangular, lobed, and the like, may also be employed with the present invention.

The module carrier 22 may be formed of any material that is sufficiently strong and rigid to support items dangling from it. In some embodiments, the carrier 22 may be formed of metal, in particular steel. The carrier 22 may take a different configuration than that illustrated and described; for example, the carrier 22 may lack side walls in some embodiments. Other configurations will be apparent to those of skill in this art.

Figure 2:
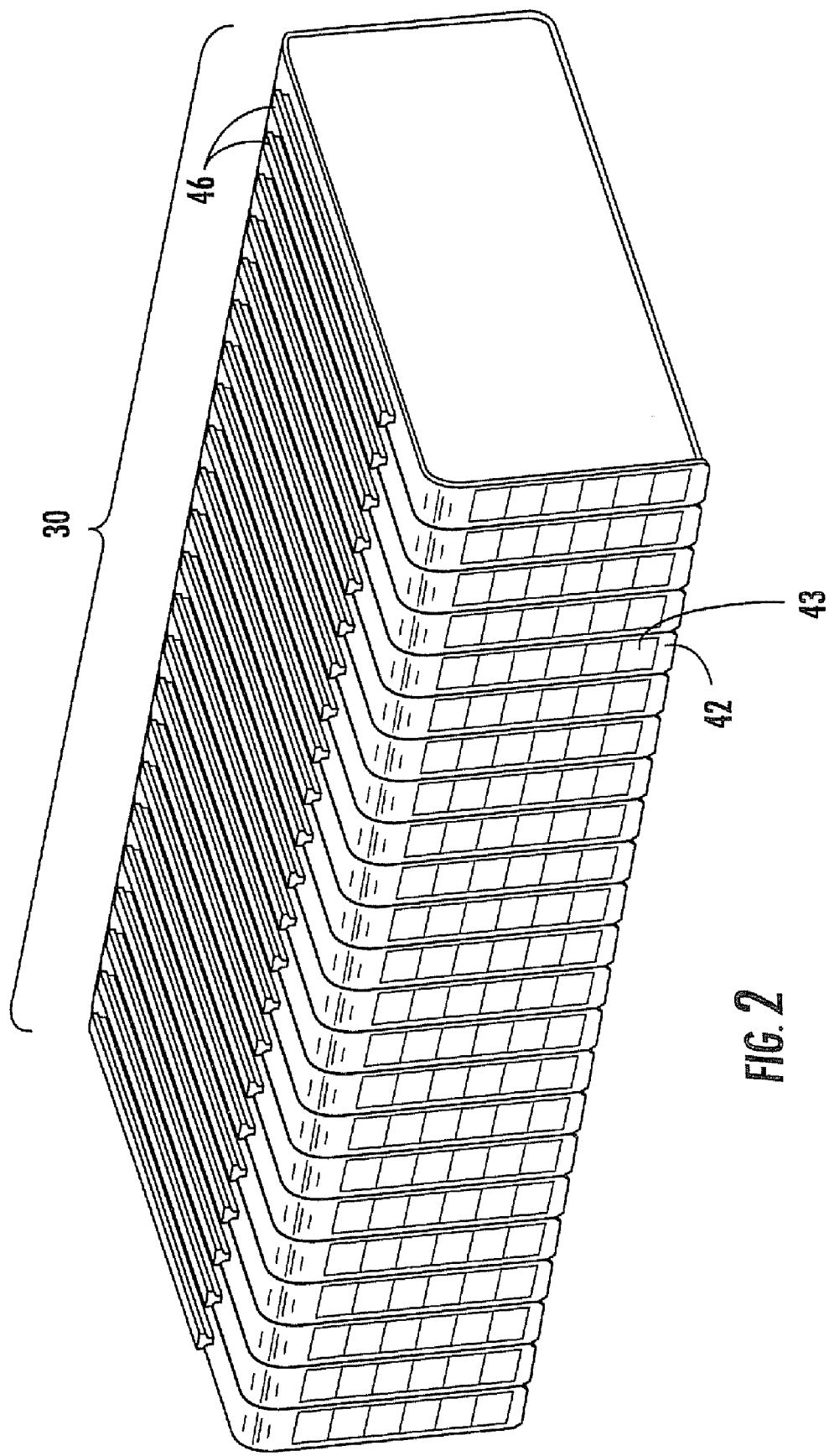
FIG. 2 is a perspective view of a plurality of patching modules of the patching module system of FIG. 1.
Figure 4:
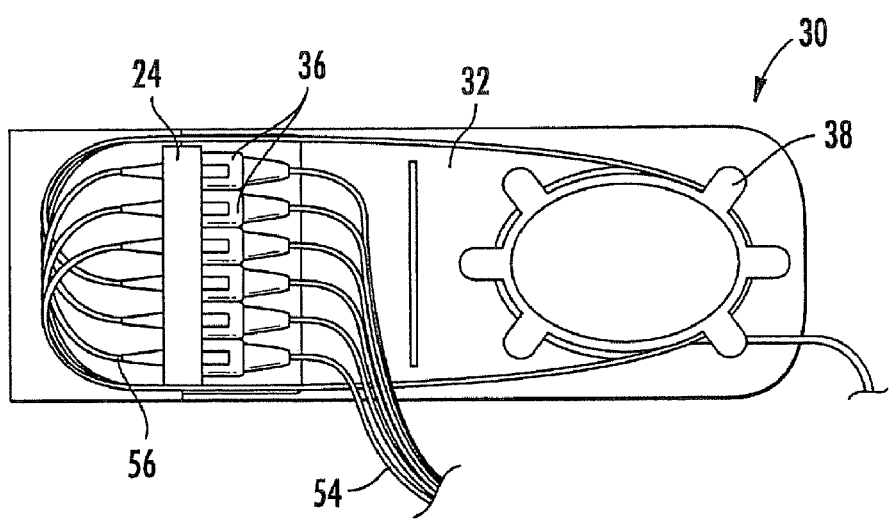
FIG. 4 is a side view of an exemplary patching module of the patching module system of FIG. 1 shown with patch cords connected to the connectors of the module.
Figure 5:
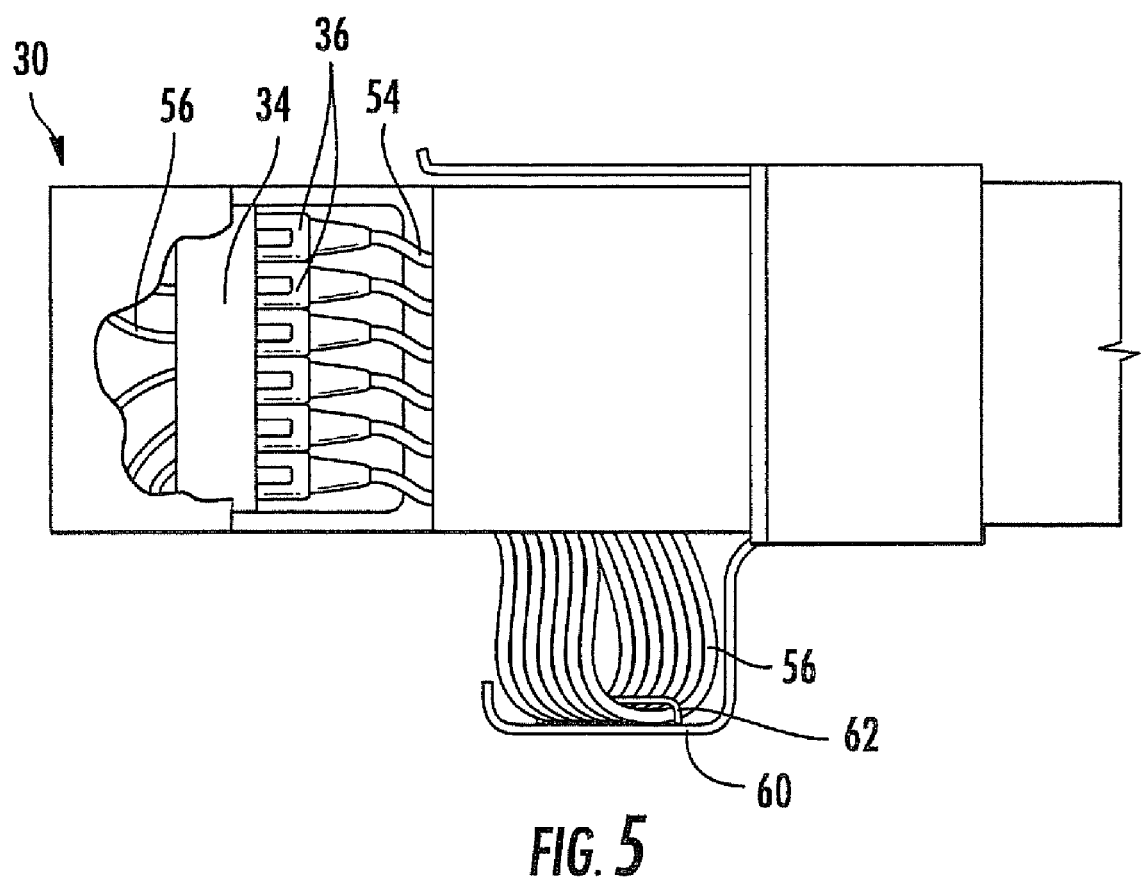
FIG. 5 is a side view of an exemplary patching module of the assembly of FIG. 1 showing patch cords routed into a trough.

Turning now to FIGS. 2, 3 and 4, the patching module system 20 includes a plurality of patching modules 30. In the illustrated embodiment, each of the modules 30 is identical to the other of the modules 30; as such, only one module 30 will be described herein. Those of skill in this art will appreciate that the discussion of the module 30 applies equally to the other modules. Also, in some embodiments one or more of the modules 30 may not be identical to the others.

Referring still to FIGS. 2, 3 and 4, each of the modules 30 includes a main panel 32, a front panel 42, a bottom panel 48 and a top panel 44. A partial panel 45 (shown in partial cutaway view in FIG. 3) may be included opposite the main panel 32. A longitudinally-extending guide 46 having a T-shaped profile due to the presence of wings 46a is attached to the top panel 44 (in other embodiments, the profile of the guide 46 may have a different shape to match a differently shaped profile of the slot 28). A connector mounting block 34 is attached to a forward portion of the main panel 32 and houses a plurality of connectors 36 that face forwardly and rearwardly. As can be seen in FIG. 4, an oval fiber guide 38 is mounted to a rear portion of the main panel 32. FIG. 3 illustrates that information regarding the interconnections of the module 30 or the like can be included on a label 43 attached to the front panel 42. It can also be seen in FIG. 3 that the bottom panel 48 includes a cutout area 50 rearward of the connector mounting block 34.

The modules 30 may be formed of any material suitable for the mounting of connectors 36. Exemplary materials may include polymeric materials, including ABS, polycarbonate and the like, or metallic materials.

Those of skill in this art will appreciate that other configurations of the module 30 may also be employed. For example, the module may lack a bottom wall, or the cutout area may be omitted or shaped differently. Also, in some embodiments the positions of the fiber guide 38 and the connector mounting block 34 may be shifted. Other variations will be apparent to those of skill in this art.

In operation, each module 30 can be mounted on the carrier 22 by inserting the guide 46 into a respective slot 28; the T-shapes of the slots 28 and guides 46 enable the modules to be suspended from the carrier 22, with the main panel 32 being generally vertically disposed. As can be seen in FIGS. 3 and 4, patch cords 54 can be routed through the cutout area 50 and into the connectors 36 of the connector mounting block 34. Additional patch cords 56 can be routed from the front of the connecting mounting block 34 to the fiber guide 38 and, from there, out the rear portion of the module 30. The patch cords 54 may be routed from the module 30 via a trough 60 that is mounted to the frame 12; patch cords 54 may be held in place in the trough 60 with a retaining bar 62. With this arrangement, all of the cords and cables can be routed away from the front panels 42 of the modules 30, which provides a neat and organized appearance to the modules 30 and permits labels 43 affixed to the front panels 42 to be easily viewed by a technician positioned in front of the rack 10.

It can also be seen in FIG. 3 that any of the modules 30 can be slid along a path defined by the slot 28 from a non-access position, in which the front panel 42 of the module 30 is generally aligned with the front panels 42 of the other modules 30, to an access position, in which the front panel 42 of the module 30 is positioned forward of the front panels 42 of the other modules 30, thereby providing access to the connectors 36 within the module. In the access position, a technician can connect, disconnect, or reconnect one or more of the patch cords 54, 56 within the module 30 without disturbing connections in any of the other modules 30. The module 30 can then be returned to its non-access position in horizontal alignment with the other modules 30.

Due to its configuration, the patching system 20 can provide increased port density. For example, in one embodiment, the system 20 is 3 U in height and includes 24 modules 30 arranged in horizontal alignment. With 6 ports per module 30, the system 20 can provide 48 ports/U.

Those skilled in this art will appreciate that other configurations for the components of the system 20 may be employed. For example, the carrier 22 may lack side walls, or may have additional walls, flanges and the like to facilitate attachment of the carrier 22 to the frame 12. In another embodiment, the carrier 22 may be horizontally disposed but inverted, such that the modules 30 reside above the main panel 23 and rest thereon rather than being suspended from the main panel 23 as shown in the illustrated embodiment. Other modifications to the carrier that enable this component to provide mounting locations for the modules 30 will be apparent to those of skill in this art.

In addition, the modules 30 may take other configurations. For example, the fiber guides 38 may be omitted, may take a different shape, or may be located in a different position on the main panel 32. Alternatively, the connector mounting block 34 may be repositioned on the main panel 32, and/or may include different numbers of connectors. Other variations may also be employed.

The foregoing embodiments are illustrative of the present invention, and are not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A telecommunication assembly, comprising:
    a frame having a pair of uprights;
    a carrier having a horizontally disposed member with longitudinal slots, the carrier mounted on the uprights of the frame;
    at least one patching module, the module comprising:
        a generally vertically disposed main panel and a bottom panel, the bottom panel having a cutout area;
        a plurality of connectors mounted on the main panel, the connectors configured to receive and interconnect patch cords; and
        a guide member connected with the main panel and received in one of the longitudinal slots of the carrier;
    a cord trough positioned below the patching module;
    a plurality of patch cords, each of the patch cords being connected to a respective one of the connectors, wherein the patch cords are routed rearwardly from the connectors through the cutout area into the cord trough;
    a plurality of cords, each of the cords being connected to a respective one of the connectors, wherein the cords are routed forwardly from the connectors, then rearwardly out of the module through the rear;
    wherein the module is slidable relative to the carrier along a path defined by the slot between an access position, in which a front portion of the main panel slides forward so that the plurality of connectors are accessible to a technician, and a non-access position, in which the plurality of connectors are not accessible to a technician.

2. The assembly defined in claim 1, wherein the module includes a front panel adapted to receive a label.

3. The assembly defined in claim 1, wherein each of the plurality of slots comprises inwardly-extending lips, and wherein the guide member of the module includes outwardly-extending wings that fit within the slot above the lips.

4. The assembly defined in claim 1, wherein the at least one module is a plurality of modules, and wherein the modules are substantially horizontally aligned with each other in the non-access position.

5. The assembly defined in claim 1, wherein the carrier and the module together have a height of about 3 U.

6. The assembly defined in claim 1, wherein the horizontally disposed member is located above the patching module, such that the patching module is suspended from the horizontally disposed member.

7. The assembly defined in claim 1, wherein the plurality of connectors are mounted in a front end portion of the main panel.

8. The assembly defined in claim 7, wherein the module includes a fiber guide mounted in the rear end portion of the main panel.

* * * * *